United States Patent
Ishii et al.

(10) Patent No.: US 6,198,924 B1
(45) Date of Patent: Mar. 6, 2001

(54) FREQUENCY CHANNEL SELECTION METHOD FOR RADIO COMMUNICATION SYSTEM

(75) Inventors: Kenichi Ishii; Tomoki Osawa, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/908,979

(22) Filed: Aug. 8, 1997

(30) Foreign Application Priority Data

Aug. 14, 1996 (JP) .................................................. 8-214556

(51) Int. Cl.⁷ ...................................................... H04B 7/00
(52) U.S. Cl. ........................... 455/434; 455/515; 455/522; 370/462
(58) Field of Search .................................. 455/11.1, 434, 455/62, 450, 69, 522, 515, 511, 440, 10, 13.4, 13.1, 516; 370/445, 437, 450, 462

(56) References Cited

U.S. PATENT DOCUMENTS

| | | | |
|---|---|---|---|
| 5,408,680 | * | 4/1995 | Hattey et al. ........................ 455/515 |
| 5,715,295 | * | 2/1998 | Yamashita ............................ 455/434 |
| 5,768,267 | * | 6/1998 | Raith et al. ........................... 455/434 |
| 5,815,795 | * | 1/1999 | Iwai .................................... 455/11.1 |
| 5,857,144 | * | 1/1999 | Mangum et al. .................... 455/11.1 |
| 5,884,171 | * | 3/1999 | Tanabe et al. ....................... 455/515 |
| 5,890,054 | * | 3/1999 | Logsdon et al. .................... 455/11.1 |
| 5,903,839 | * | 5/1999 | Mattila ................................ 455/515 |

FOREIGN PATENT DOCUMENTS 3-174827  7/1991 (JP).

OTHER PUBLICATIONS

"Draft Standard IEEE802.11, P 802. 11D2.0, Wireless LAN Medium Access Control and Physical Layer (PHY) Specifications", Jul. 28, 1995.

* cited by examiner

Primary Examiner—Reinhard J. Eisenzopf
Assistant Examiner—Lester G. Kincaid
(74) Attorney, Agent, or Firm—McGuireWoods LLP

(57) ABSTRACT

In a channel selection method for a radio communication system constituted by a plurality of radio stations, each radio station transmits a control signal only when required, but need not constantly transmit a control signal.

25 Claims, 12 Drawing Sheets

FREQUENCY CHANNEL SELECTION METHOD FOR RADIO COMMUNICATION SYSTEM

BACKGROUND OF THE INVENTION

1. Field of the Invention

The present invention relates to a frequency channel selection method for a radio communication system and, more particularly, to a frequency channel selection method for a radio communication system in which a plurality of radio stations communicate with each other.

2. Description of the Prior Art

In a conventional radio communication system such as a car or cellular telephone system, the service area is covered by a plurality of basic stations, and the same frequency channel (to be simply referred to as a channel hereinafter) is repeatedly used between basic stations which cause no radio interference, thereby realizing the effective use of frequencies. Such a system is called a cellular system. In the cellular system, when a given basic station and a given movable station start to communicate with each other, the basic station measures the carrier to co-channel interference ratio (to be referred to as a C/I hereinafter) of each of unused channels to select a channel that has a lower interference wave power and a C/I higher than a predetermined C/I. In general, a desired carrier power (C) is obtained by measuring the reception power of a control channel ensured independently of a communication channel, and an interference wave power (I) is obtained by measuring the reception power of the communication channel to be selected, as in the channel assigning method disclosed in Japanese Unexamined Patent Publication No. 3-174827.

In a radio packet communication system like the one disclosed in Draft Standard IEEE802. 11, P802. 11D2.0, Wireless LAN Medium Access Control and Physical Layer Specifications, one radio link is shared by one basic station and a plurality of movable stations which are connected to a wire network. Channels are permanently assigned to the respective basic stations on the basis of propagation environments and predicted communication traffics. The user of a given movable station manually sets a channel to be used on the radio link to which the given station belongs. Alternatively, a channel is set on the basis of a control signal which is constantly or periodically transmitted from a basic station. Since the output of each basic station is fixed, the coverage of the service area is also fixed.

As described above, in the conventional radio communication system, to select a channel, a control channel other than a communication channel is required, or a control signal must be periodically transmitted. For this reason, frequencies cannot be effectively used.

In addition, as described above, in the conventional radio packet communication system, channels are permanently assigned to the respective basic stations. For this reason, when a plurality of basic stations are to be installed, channel assignment design must be performed in advance to assign specific channels to specific basic stations. Such assignment of channels cannot be automatically performed. Furthermore, since the output of each basic station cannot be automatically changed depending on communication states, communication is sometimes performed on a transmission power that is higher than required, resulting in an increase in interference wave power in other radio stations.

SUMMARY OF THE INVENTION

The present invention has been made in consideration of the above situation in the prior art, and has as its object to provide a channel selection method for a radio communication system, in which when a channel is to be dynamically selected, control signals need not be constantly or periodically transmitted, and radio channels can be effectively used.

According to the present invention, each radio station dynamically selects a channel to be used in accordance with the radio environment set for each station and the form of a radio link to be established. Each station does not use control signals which are constantly or periodically transmitted, but transmits a control signal only when each station determines that transmission of the signal is required.

In order to achieve the above object, according to the first aspect of the present invention, there is provided a channel selection method for a radio communication system constituted by a plurality of radio stations, comprising causing each radio station to transmit a control signal only when required, but causing each radio station not to constantly transmit a control signal.

According to the second aspect of the present invention, the channel selection method according to the first aspect is characterized by comprising, when each radio station is to perform packet communication to irregularly and discontinuously perform communication, causing each radio station to transmit a control signal as a control packet by using a communication channel.

According to the third aspect of the present invention, the channel selection method according to the second aspect is characterized by comprising causing a radio station which is to perform communication to check a state of a communication channel, select a channel determined as a channel that is not being used any other radio station when a new radio link is to be established, and select a channel determined as a channel that is being used by some other radio station when the radio station is to be connected to an existing radio link.

According to the fourth aspect of the present invention, the channel selection method according to the second and third aspects is characterized by comprising when a radio station which is to perform communication checks states of communication channels, causing the radio station to determine the use states of the channels by receiving packets transmitted from other radio stations by using the respective channels.

According to the fifth aspect of the present invention, the channel selection method according to the second, third, and fourth aspects is characterized by comprising, when a radio station which is to perform communication checks a state of a communication channel, causing the radio station to transmit the control packet and determine the use state of the channel on the basis of a response to the control packet from some other station.

According to the sixth aspect of the present invention, the channel selection method according to the fifth aspect is characterized by comprising causing a radio station which has received the control packet transmitted from the radio station which is to perform communication to transmit a response control packet.

According to the seventh aspect of the present invention, the channel selection method according to the fifth aspect is characterized by comprising causing a radio station which has received the control packet transmitted from the radio station which is to perform communication to transmit no response control packet upon reception of a response control packet from some other radio station.

According to the eighth aspect of the present invention, the channel selection method according to the fifth aspect is characterized by comprising causing only a specific one of radio stations which have received the control packet transmitted from the radio station which is to perform communication to transmit a response control packet.

According to the ninth aspect of the present invention, the channel selection method according to the third aspect is characterized by comprising causing a radio station which is to perform communication to check states of communication channels in a predetermined order common to all radio stations, select a channel if the channel can be selected, and check a next channel if the channel cannot be selected.

According to the 10th aspect of the present invention, the channel selection method according to the third aspect is characterized by comprising causing a radio station which is to perform communication to normally check states of communication channels in a predetermined order common to all radio stations, check the states of the communication channels in a reverse order to the predetermined order when an independent network is to be constructed, select a channel if the channel can be selected, and check a state of a next channel if the channel cannot be selected.

According to the 11th aspect of the present invention, the channel selection method according to the second aspect is characterized by comprising causing each radio base station to transmit a transmission power of a packet from the self-station as information, and causing a radio station which is to perform communication to transmit a packet with a maximum transmission power first in packet transmission, and then determine a transmission power of a packet from the self-station on the basis of a reception power of a packet from a distant radio station and a transmission power of the packet.

According to the 12th aspect of the present invention, the channel selection method according to the second aspect is characterized by comprising causing each radio base station to transmit a transmission power of a packet from the self-station as information, and causing a radio station which is to perform communication to determine, if a packet has been received from a destination radio station, a transmission power of a packet from the self-station in packet transmission on the basis of a reception power of the received packet and a transmission power of the packet, and set, if no packet has been received from the destination radio station, the transmission power of the packet from the self-station to the maximum transmission power.

According to the present invention, since a channel to be used by a given radio station can be dynamically selected without using any control channel, and the transmission power can be suppressed, the use efficiency of channels can be improved. In addition, channel assignment need not be designed in advance. Even when a network is constituted by only movable stations, channel selection can be automatically performed.

According to the present invention, therefore, channel assignment design need not be performed by predicting a complicated propagation environment and a communication traffic; channel assignment can be automatically performed in accordance with an actual propagation environment and a communication traffic.

According to the first aspect, since neither control signal channel nor periodic transmission of control signals are required, the radio resources can be saved.

According to the second aspect, in packet communication, channel selection can be performed while transmission of unnecessary control signals is prevented.

According to the third aspect, channels to be selected can be dynamically changed in accordance with the connection form of radio stations.

According to the fourth aspect, channel selection can be performed on the basis of the actual state of a communication channel.

According to the fifth aspect, in checking the communication state of a each channel, a given radio station need not wait until other radio stations start communicating with each other, thereby shortening the time required to check the communication state of each channel.

According to the sixth aspect, when a radio station which is to perform communication selects a channel, the station can receive responses from all radio stations which are influenced by the selection of the channel. The radio station can therefore select a channel on the basis of information about all the stations which are influenced.

According to the seventh aspect, a radio station which is to perform communication can check whether a given channel is being used, and can decrease the number of response packets received from other radio stations.

According to the eighth aspect, only minimum necessary radio stations transmit response packets, and hence the number of unnecessary response packets can be decreased.

According to the ninth aspect, since channels of small ordinal numbers in the selection order are used by many radio stations, the number of channels to be checked in channel selection can be decreased.

According to the 10th aspect, since channels of small ordinal numbers in the selection order are used by many radio stations, the time required for channel selection can be shortened when a given radio station is to be connected to an existing network. When an independent network is to be constructed, the number of channels to be checked to find a channel that can be used can be decreased by checking channels from those used less frequently.

According to the 11th and 12th aspects, a packet can be transmitted with the optimal transmission power.

The above and many other objects, features and advantages of the present invention will become manifest to those skilled in the art upon making reference to the following detailed description and accompanying drawings in which preferred embodiments incorporating the principles of the present invention are shown by way of illustrative example.

DETAILED DESCRIPTION OF THE PREFERRED EMBODIMENTS

Several preferred embodiments of the present invention will be described below with reference to the accompanying drawings.

Figure 1:
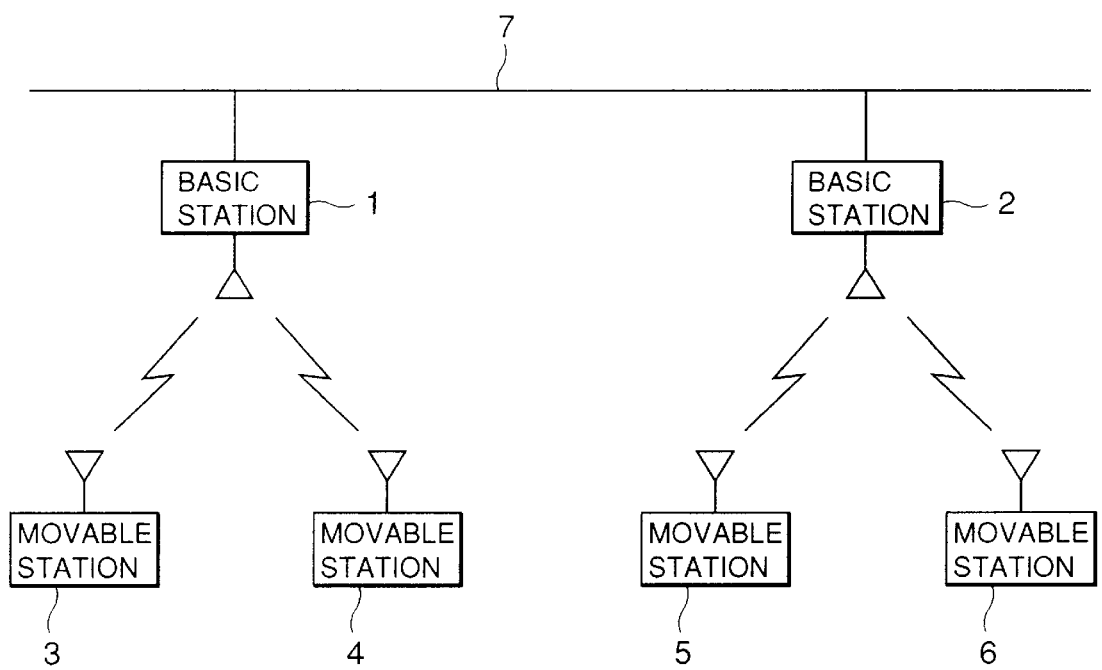
FIG. 1 is a block diagram showing the schematic arrangement of the first and basic embodiment of the present invention.

FIG. 1 schematically shows the arrangement of the first and basic embodiment of the present invention.

This embodiment is constituted by a plurality of basic stations connected to a wire network 7, including basic stations 1 and 2, and a plurality of movable stations including movable stations 3, 4, 5, and 6. A plurality of movable stations including the movable stations 3 and 4 are connected to the basic station 1 to perform communication. A plurality of movable stations including the movable stations 5 and 6 are connected to the basic station 2 to perform communication. The basic station 1 communicates with the plurality of movable stations connected thereto, including the movable stations 3 and 4, by using a single channel (Ch1). The plurality of movable stations connected to the basic station 1, including the movable stations 3 and 4, communicate each other by using the channel Ch1 that is used by the basic station 1. Similarly, the basic station 2 communicates with the plurality of movable stations connected thereto, including the movable stations 5 and 6, by using a signal channel (Ch2). The plurality of movable stations connected to the basic station 2, including the movable stations 5 and 6, communicate with each other by using the channel Ch2 that is used by the basic station 2. In this case, the channels Ch1 and Ch2 may be identical. In transmitting a packet, each radio station adds the transmission power of the packet as additional information to the packet.

Figure 2:
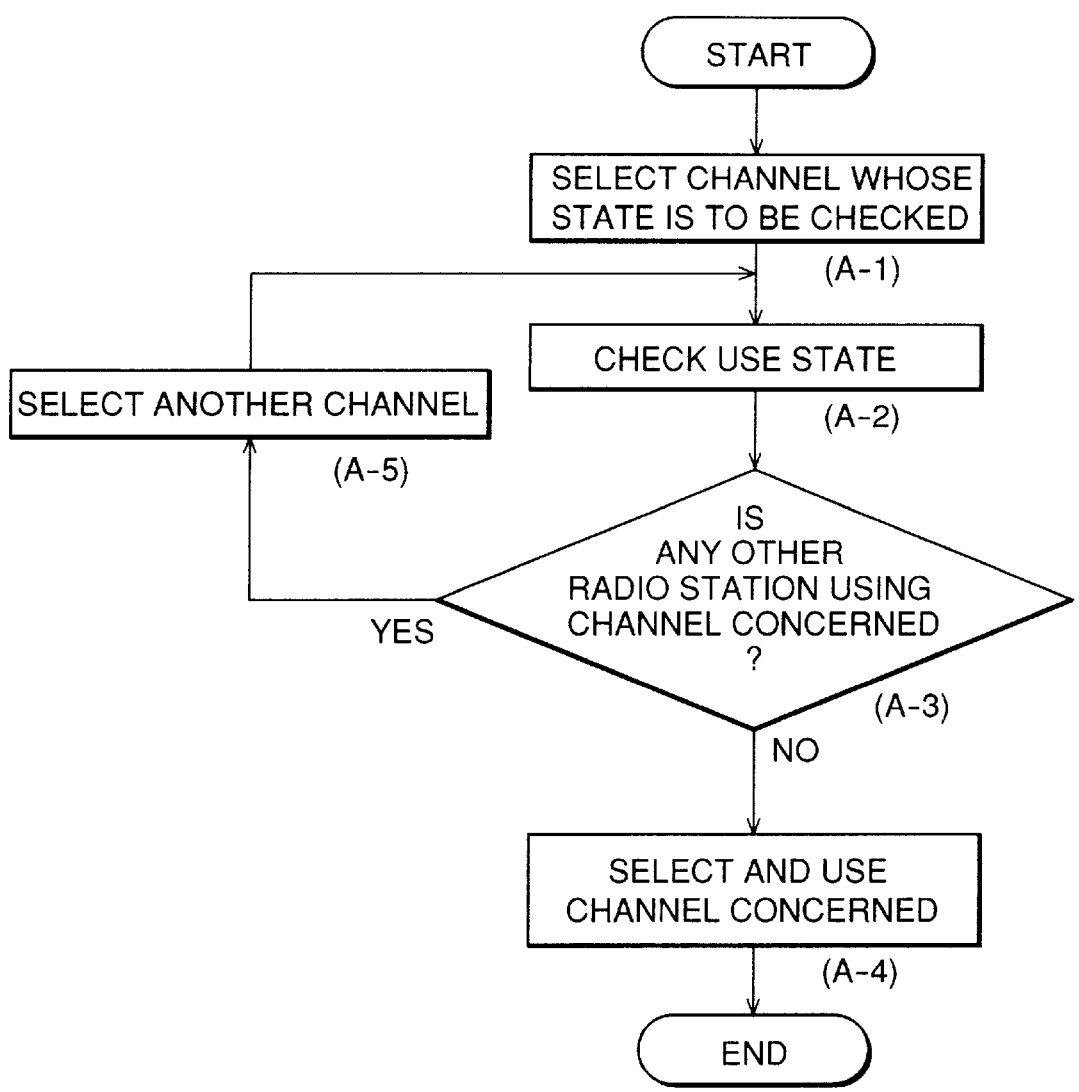
FIG. 2 is a flow chart showing a procedure for selecting a channel in a given basic station.

FIG. 2 shows a procedure to follow when a channel is to be selected in a given basic station.

The basic station is not connected to an existing radio link but needs to establish a new radio link. The basic station therefore selects a channel that is not used by any other radio station. In channel selection, first of all, the basic station selects an arbitrary channel (step A-1), and checks the use state of the channel (step A-2) to check whether the channel is being used by any other radio station (step A-3). If it is determined that no other station is using the channel, the basic station uses the channel (step A-4). If it is determined that some radio station is using the channel, the basic station selects another channel (step A-5). In this manner, the basic station repeatedly checks the use state of the channel.

Figure 3:
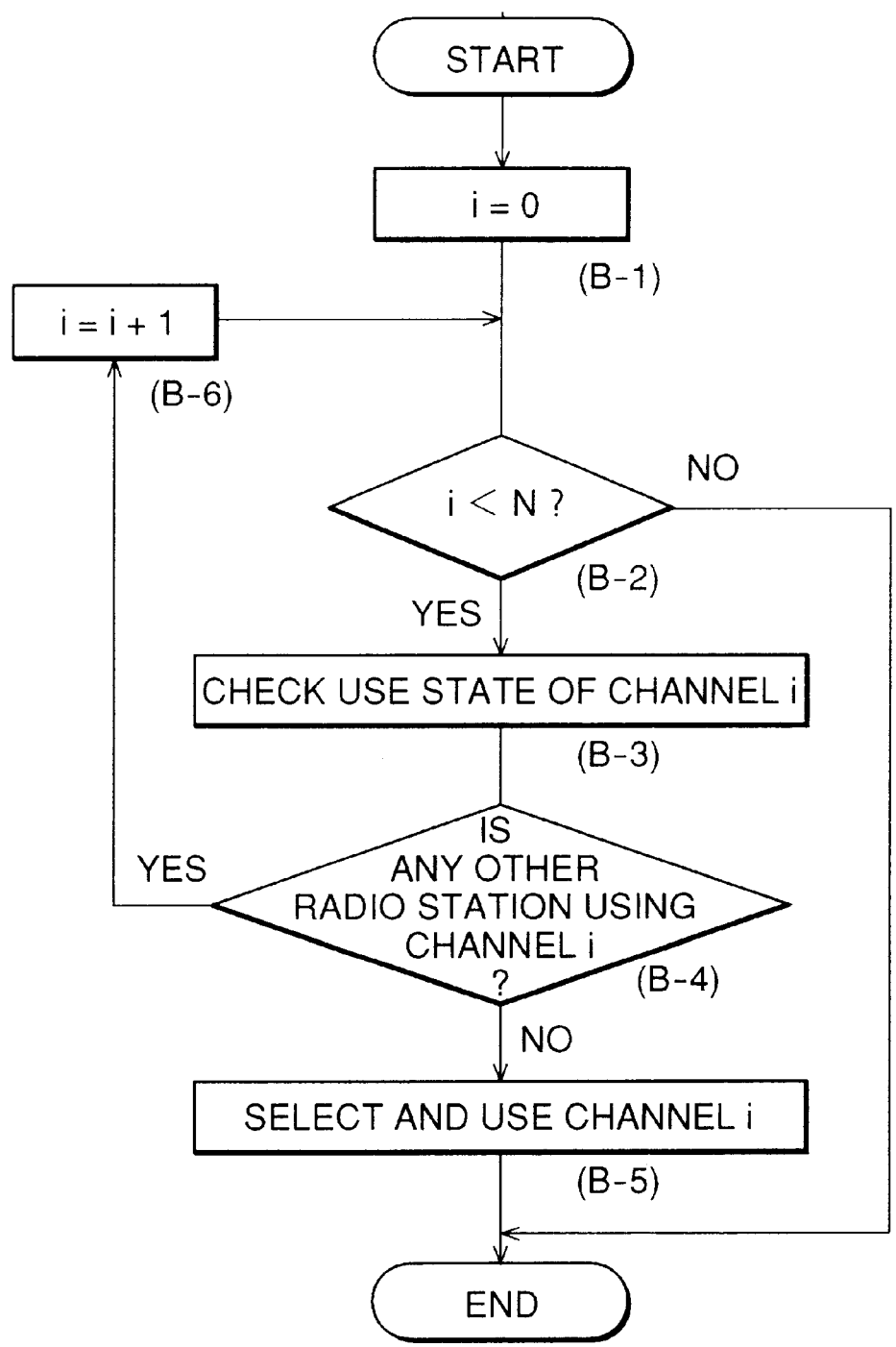
FIG. 3 is a flow chart showing a case in which the channel selection procedure in FIG. 2 is made common to all cells.

FIG. 3 shows a case in which the selecting order of channels in FIG. 2 is made common to all cells.

Assume that there are N channels, and the numbers from 0 to (N−1) are assigned to the respective channels. First of all, the basic station selects channel 0 (step B-1), and checks the use state of the channel ((step B-3) to check whether the channel is being used by any other radio station (step B-4). If it is determined that no other radio station is using the channel, the basic station uses the channel (step B-5). If it is determined that some radio station is using the channel, "i=i+1" is set, and the next channel is selected (step B-6). If it is determined that all the channels are not checked ((step B-2), the basic station repeatedly checks the use state of a channel. Instead of using this method, the basic station may use a method of checking all the channels first, and then selecting one of the usable channels.

Figure 4:
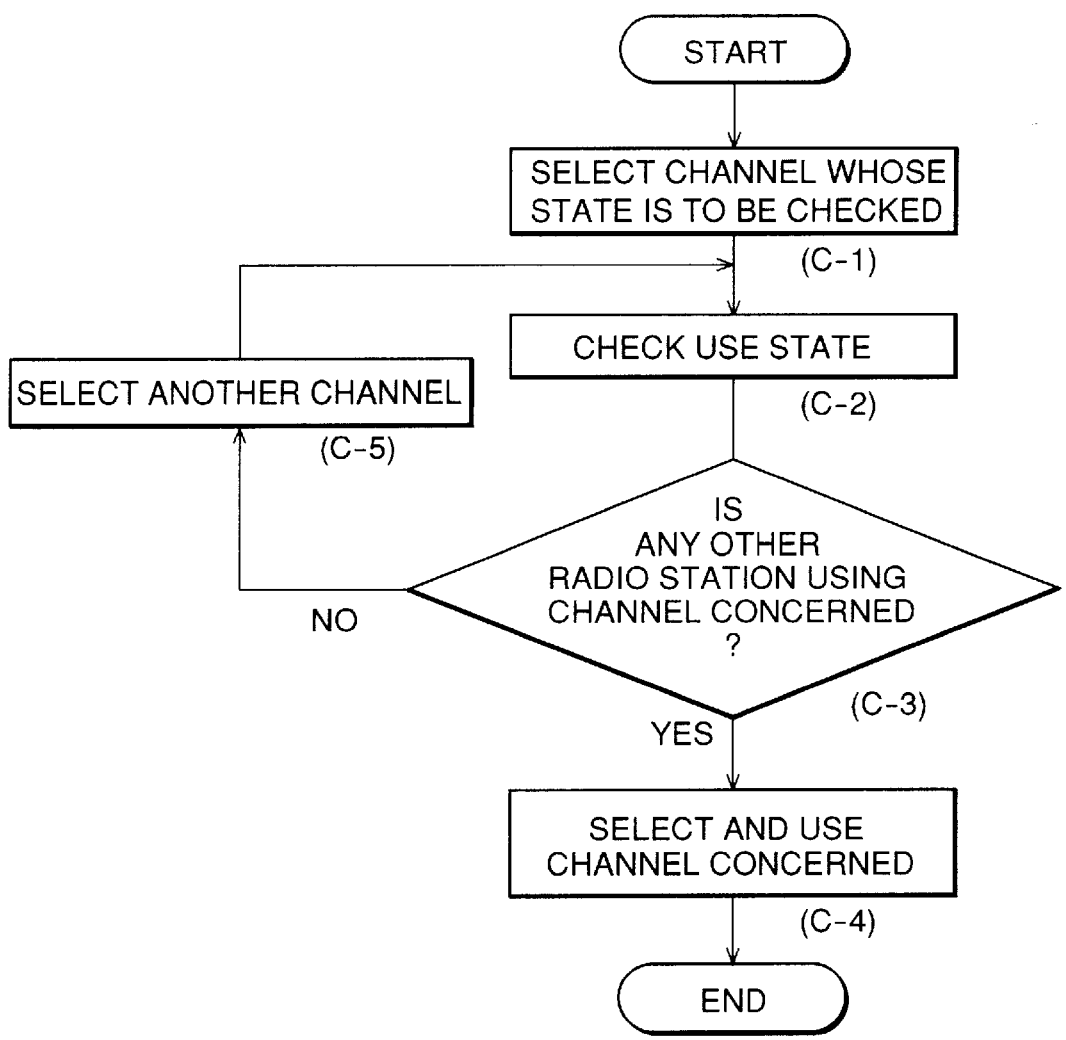
FIG. 4 is a flow chart showing a channel selection procedure to follow when a given movable station is connected to a given basic station.

FIG. 4 shows a channel selection procedure to follow when a given movable station is to be connected to a given basic station.

When the movable station is to be connected to the basic station, the movable station needs to be connected to an existing radio link, and hence selects a channel that is being used by some other radio station. In channel selection, first of all, the movable station selects an arbitrary channel (step C-1), and checks the use of the channel (step C-2) to check whether the channel is being used by any other radio station (step C-3). If it is determined that some other radio station is using the channel, the movable station uses the channel (step C-4). If it is determined that no other radio station is using the channel, the movable station selects another channel (step C-5), and repeatedly checks the use state of the selected channel.

Figure 5:
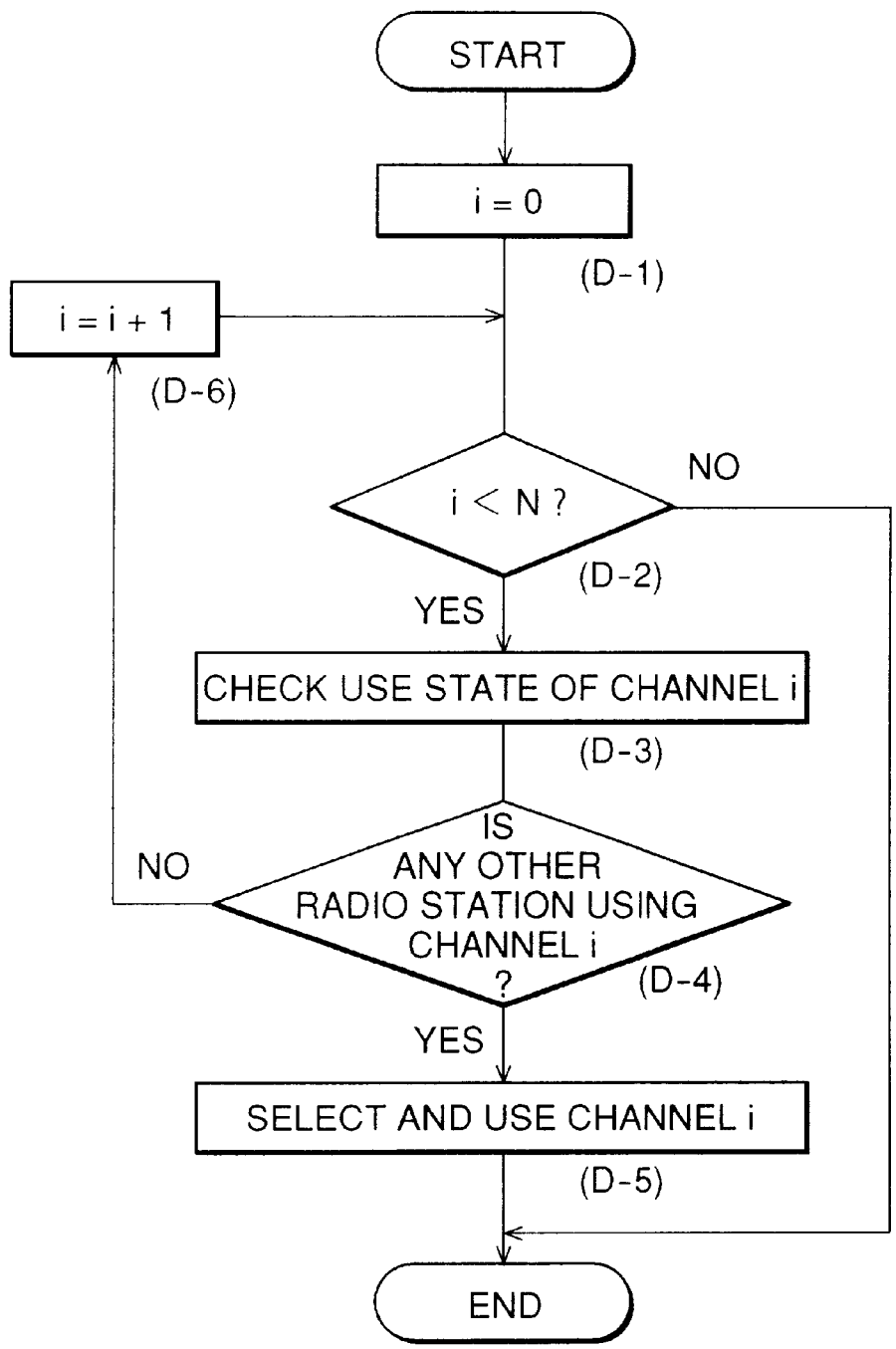
FIG. 5 is a flow chart showing a case in which the selecting order of channels in the procedure in FIG. 4 is made the same as that in the basic station in FIG. 3.

FIG. 5 shows a case in which the selecting order of channels in FIG. 4 is made the same as that in the basic station in FIG. 3.

First of all, the movable station selects channel 0 (step D-1), and checks the use state of the channel (step D-3) to check whether the channel is being used by any other radio station (step D-4). If it is determined that some other radio station is using the channel, the movable station uses the channel (step D-5). If it is determined that no other radio station is using the channel, "i=i+1" is set, and the next channel is selected (step D-6). If it is determined that all the channels are not checked (step D-2), the movable station repeatedly checks the use state of a channel. Instead of using this method, the movable station may use a method of checking all the channels first, and then selecting one of the usable channels.

Figure 6:
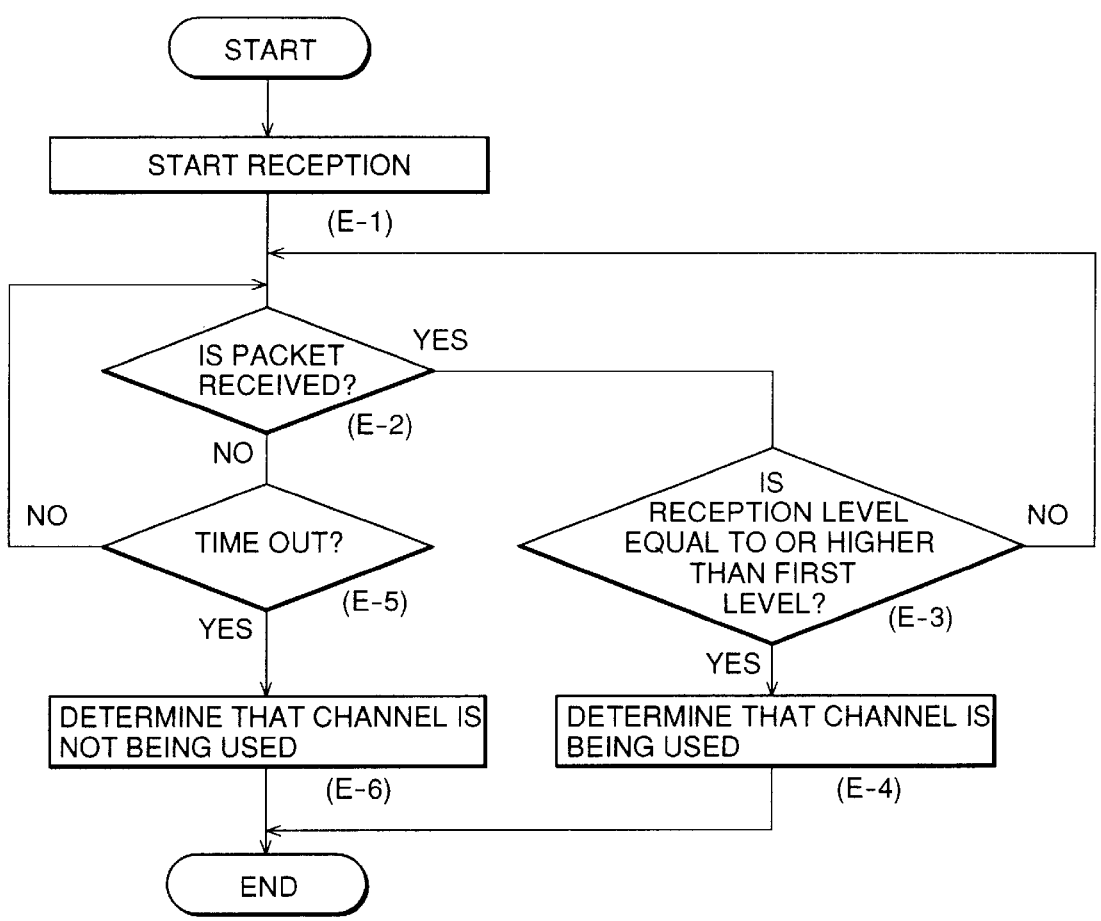
FIG. 6 is a flow chart showing a procedure associated with the process of checking a channel in FIGS. 3 and 4.

FIG. 6 shows a procedure associated with the process of checking a channel in FIGS. 3 and 4.

A given radio station waits for the reception of a packet flowing on a channel for a predetermined period of time (step E-1). If the ratio station receives a packet within the predetermined period of time (step E-2), the radio station checks the reception quality of the packet (step E-3). If the reception level is equal to or higher than the first level, the radio station determines that the channel is being used (step E-4). Otherwise, the flow returns to the step of receiving a packet. If the radio station cannot receive a packet having reception quality equal to or higher than the first level even after a lapse of the predetermined period of time (step E-5), the radio station determines that the channel is not being used (step E-6). With this procedure, the radio station can determine the actual use state of each channel.

Figure 7:
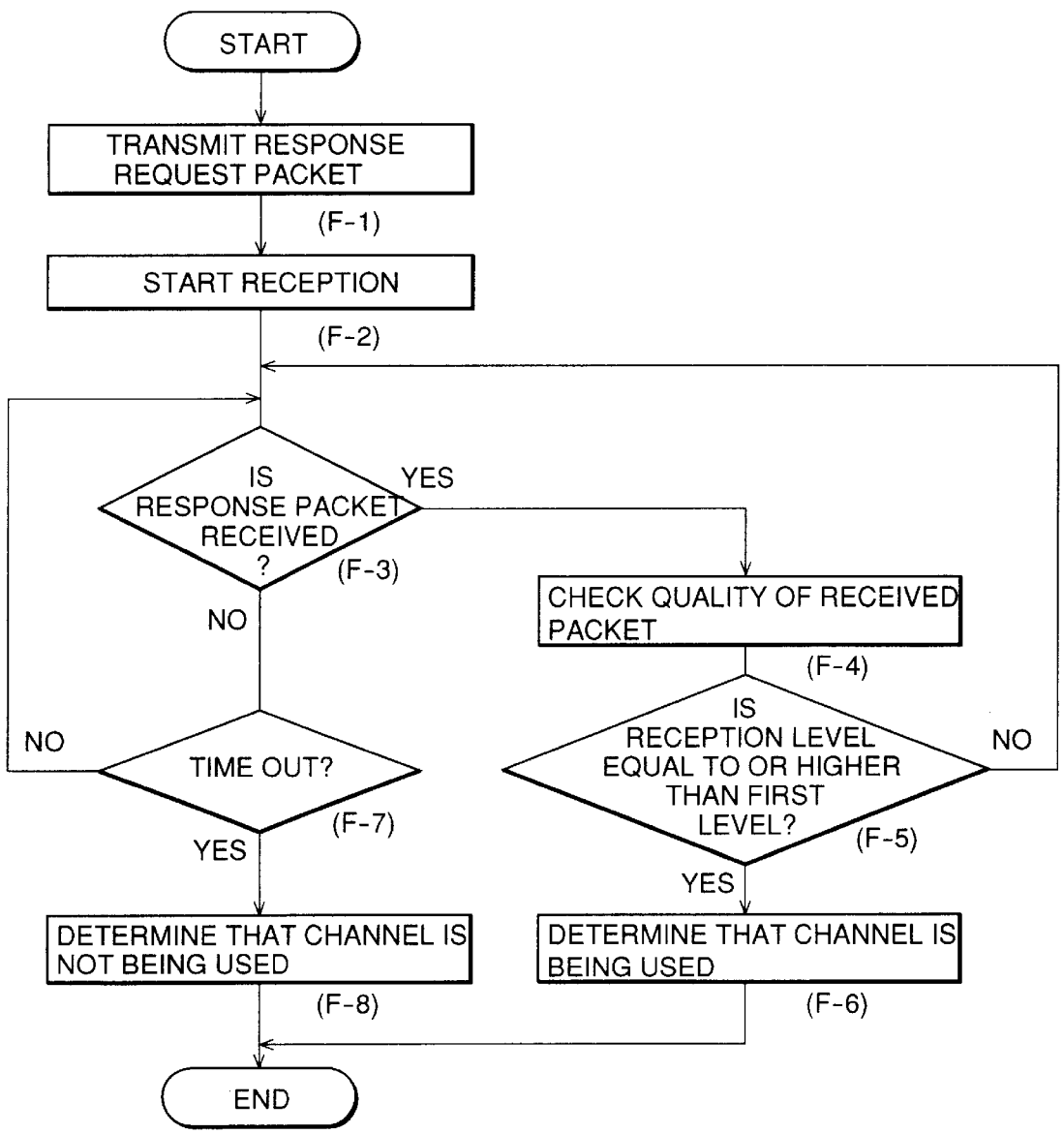
FIG. 7 is a flow chart showing a procedure for checking a channel in a given radio station.
Figure 8:
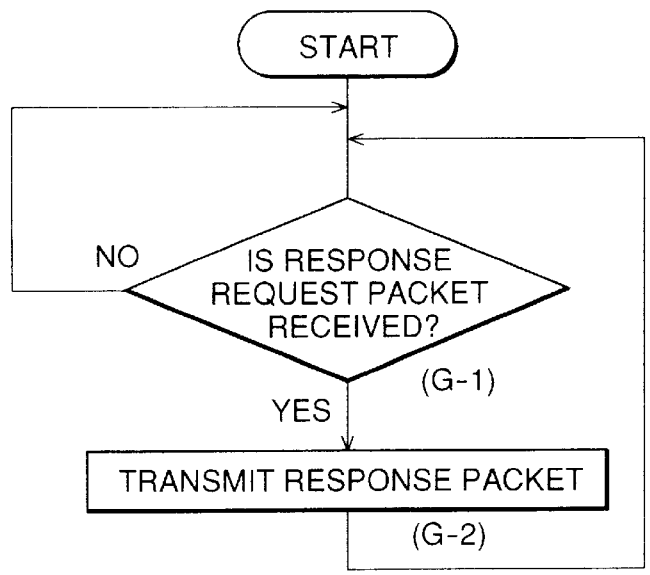
FIGS. 8 to 10 are flow charts each showing a procedure in a given station which has received a response request packet.

FIGS. 7 and 8 respectively show a procedure in a radio station which transmits a response request packet and a procedure in a radio station which transmits a response packet in a case in which the system further includes a function of causing a radio station which is to check a channel to transmit a response request packet, and causing a radio station which has received the response request packet to transmit a response packet in executing the channel checking procedure in FIG. 6.

FIG. 7 shows the procedure in the radio station which is to check a channel.

In checking a channel, first of all, the radio station transmits a response request packet to other radio stations (step F-1). The radio station then waits for the reception of a packet flowing on the channel for a predetermined period of time (step F-2). If the radio station receives a packet within the predetermined period of time (step F-3), the radio station checks the reception quality of this packet (step F-4). If the reception level is equal to or higher than the first level (step F-5), the radio station determines that the channel is being used (step F-6). Otherwise, the flow returns to the step of receiving a packet. If the radio base station cannot receive a packet having reception quality equal to or higher than the first level, the radio station determines that the channel is not being used (step F-8).

FIG. 8 shows the procedure in the radio station which has received the response request packet.

Upon reception of the response request packet (step G-1), the radio base station transmits a response packet (step G-2).

According to the procedures shown in FIGS. 7 and 8, the radio station may receive a response to a packet transmitted therefrom instead of waiting for the reception of packets irregularly transmitted other stations. Therefore, the time required to determine the actual use states of channels can be shortened.

Figure 9:
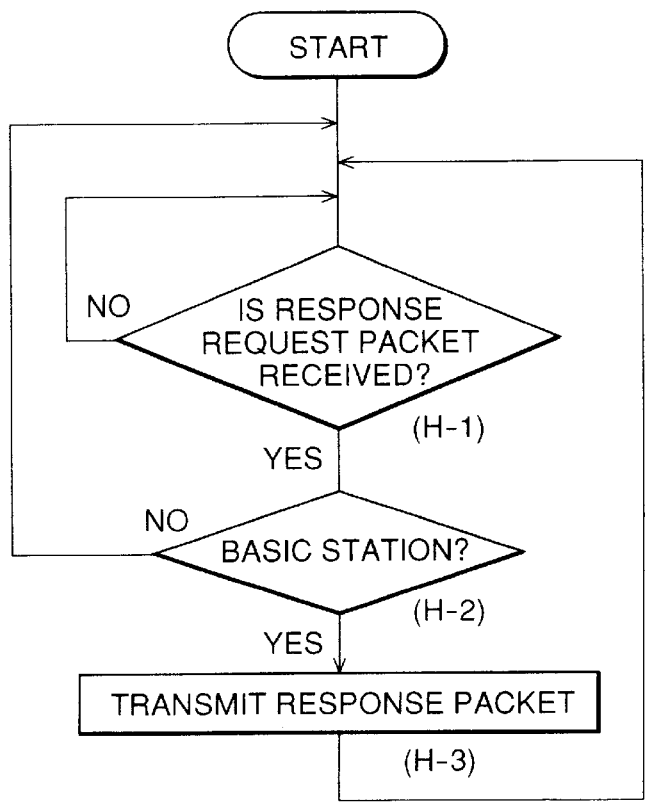

FIG. 9 shows another procedure in a station which has received a response request packet.

When the radio station receives a response request packet (step H-1), if the radio station is a basic station (step H-2), the station transmits a response packet (step H-3). With this operation, the movable station which has received the response packet can check whether it can be connected to the basic station.

Figure 10:
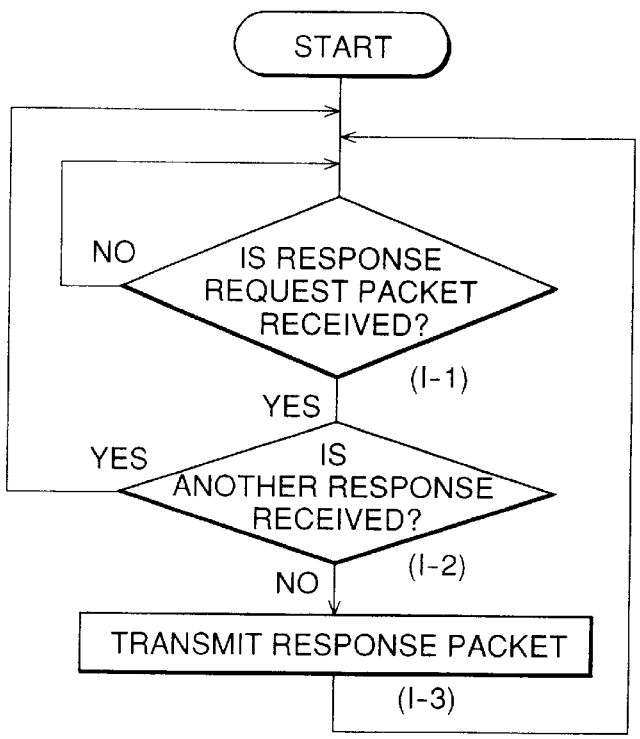

FIG. 10 shows still another procedure in a station which has received a response request packet.

When the radio station receives a response request packet (step I-1), if the radio station has not received a response packet to the request response packet from any other station (step I-2), the radio station transmits a response packet (step I-3). With this operation, only one of the radio base stations which have received response packets transmits a response packet, and hence the number of response packets flowing on the channel can be decreased.

Figure 11:
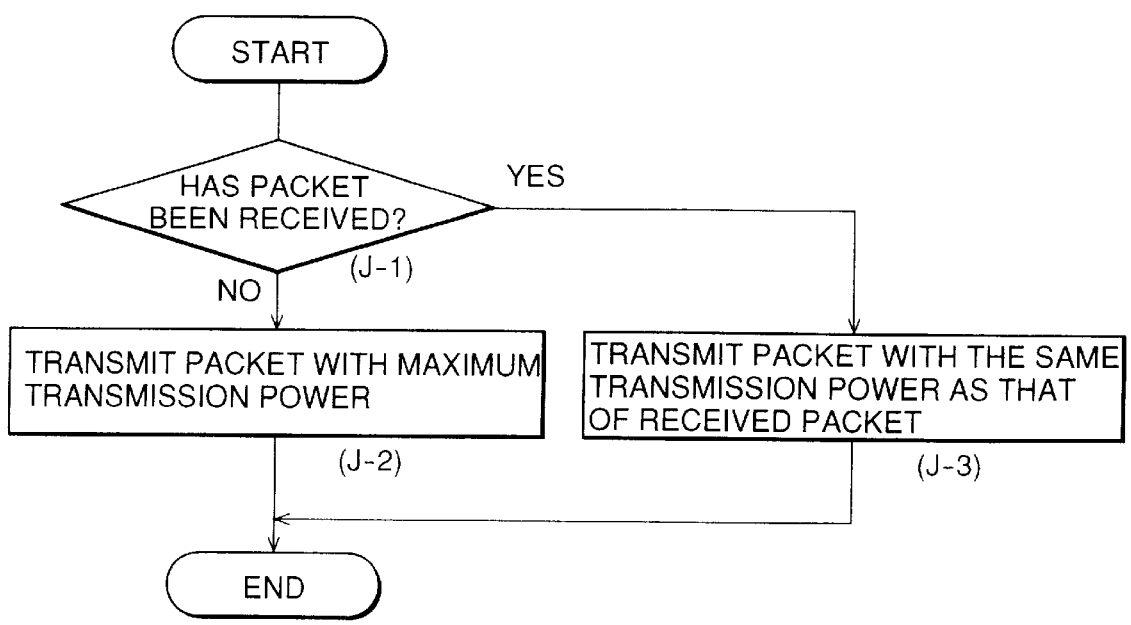
FIGS. 11 and 12 are flow charts each showing a transmission power control procedure to follow when a given radio station is to transmit a packet.

FIG. 11 shows a transmission power control procedure to follow when a radio station is to transmit a packet.

Assume that transmission power information is added to each packet on the transmission side. In transmitting a packet, the radio station checks whether a packet has been received from the destination radio station within a predetermined period of time (step J-1). If it is determined that no packet has been received, the radio station transmits a packet with the maximum power (step J-2). If it is determined a packet has been received, the radio station transmits a packet with the same transmission power as that added to the received packet (step J-3). According to this procedure, the transmission power in the radio station which transmits a packet can be suppressed while communication between the radio stations is maintained.

Figure 12:
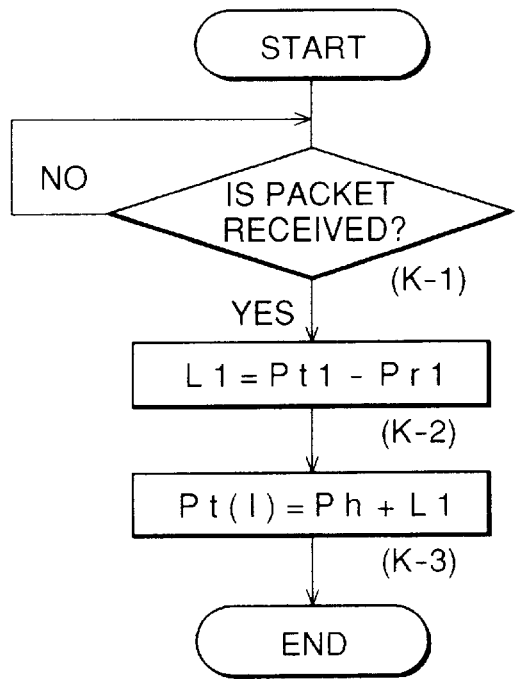

FIG. 12 shows another transmission power control procedure to follow when a radio station is to transmit a packet.

Assume that each radio station has a transmission power table Pt(I) for each of distant radio stations with which each radio station communicates. Assume also that the initial value of this table is the maximum transmission power. In this case, the number uniquely assigned to a distant radio station with which a given radio station communicates is represented by I. Upon reception of a packet (step K-1), each radio station calculates a propagation loss L1 of the packet on the basis of a reception power Pr1 of the received packet and a transmission power Pt1 of the packet according to L1=Pt1−Pr1 (step K-2). The radio station then sets Pt(I)= Ph+L1 as a transmission power for the destination radio station I, to which the packet is to be transmitted, on the basis of a predetermined reception power Ph as the minimum reception power required for communication (step K-3). With this operation, the transmission power can be minimized on the basis of the propagation loss between the respective radio stations while communication between the radio stations is maintained.

Figure 13:
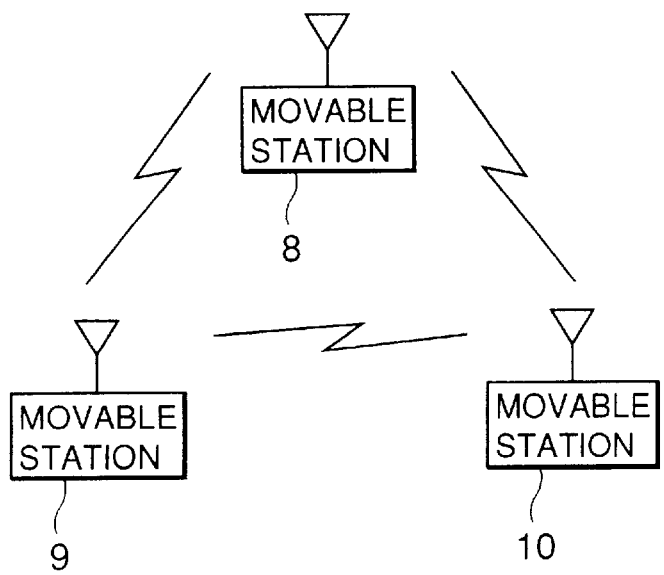
FIGS. 13 and 14 are block diagrams respectively showing the schematic arrangements of the second and third embodiments of the present invention.

FIG. 13 shows the second embodiment of the present invention.

This embodiment includes no basic stations connected to a wire network, but is constituted by only a plurality of movable stations including movable stations 8, 9, and 10. In this arrangement, first of all, an arbitrary movable station serves as a master station and selects a channel. Thereafter, movable stations, other than the master station, which are called subsidiary stations, perform communication by using the channel selected by the master station. In channel selection, to establish a new radio link, the master station selects and uses a channel that is not being used by any other radio station. In channel selection, a given subsidiary station selects the channel that is being used by the master station from the channels that are being used by other radio stations.

When such a network independent of an existing network is constructed, the master station performs the same control as that performed by a basic station in the first embodiment. With this operation, a channel can be dynamically selected without using a control channel even in a network having no basic stations.

Figure 14:
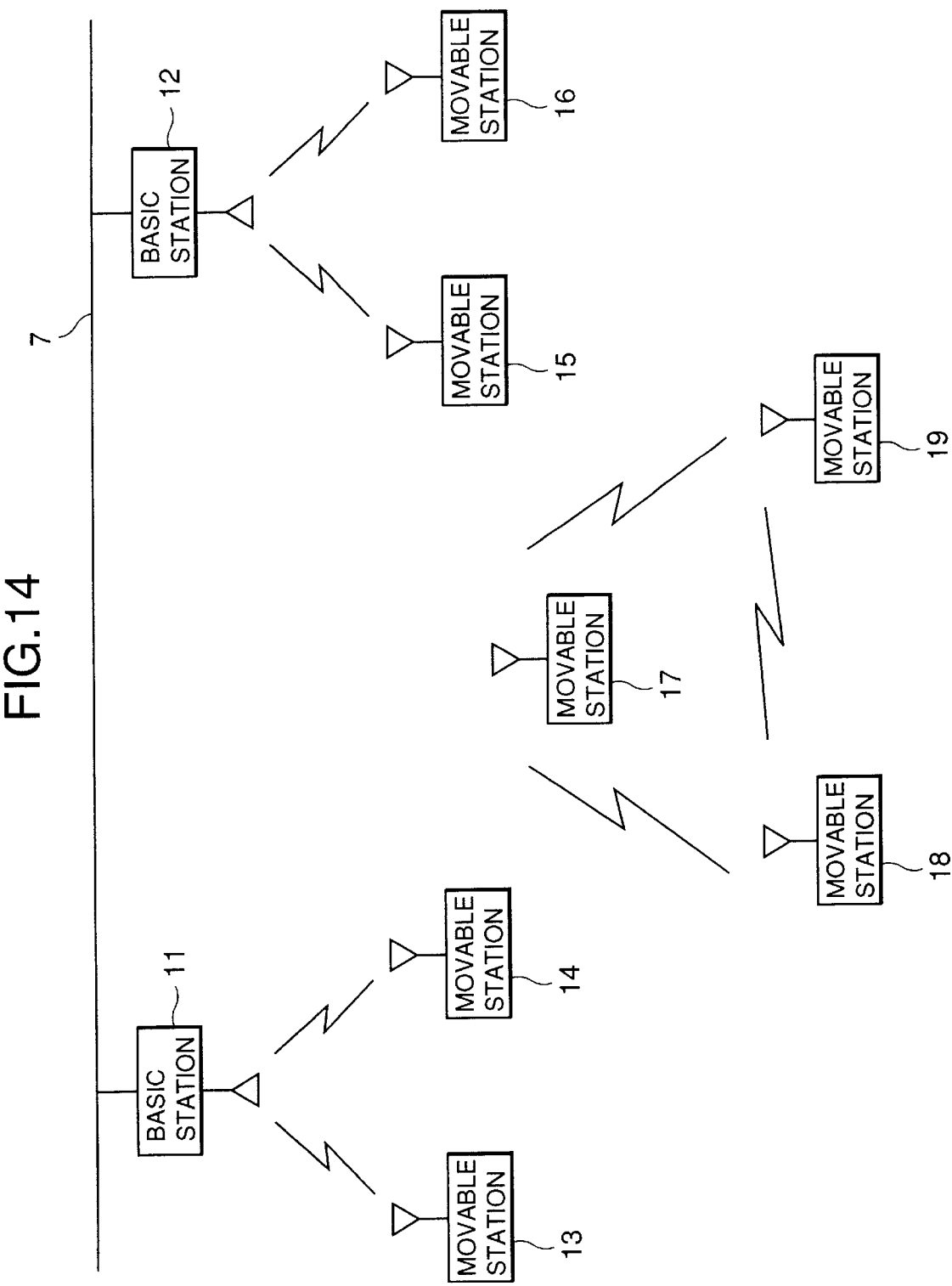

FIG. 14 shows the third embodiment of the present invention.

In this embodiment, both the arrangements of the first and second embodiments are present. This arrangement is constituted by a plurality of basic stations 11 and 12 and a plurality of movable stations 13, 14, 15, 16, 17, 18, and 19.

Even in this arrangement, in which both a network including basic stations and a network including no basic stations are present, the basic stations and the movable stations dynamically select channels to be used as in the first and second embodiments.

Figure 15:
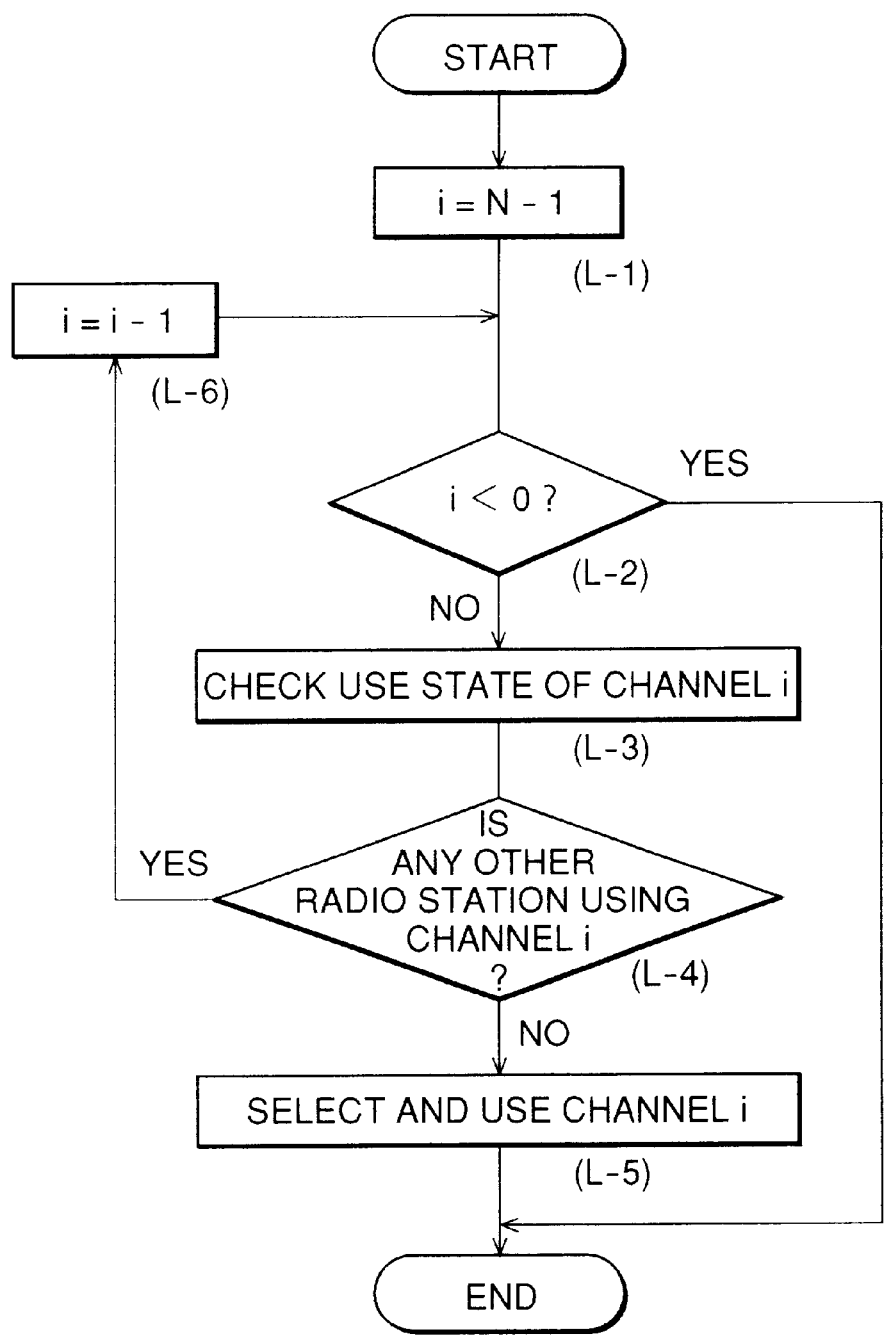
FIG. 15 is a flow chart showing a procedure to follow when channel selection in a given basic station is performed according to the procedure in FIG. 3, and a given movable station is to construct a new, independent network.

FIG. 15 shows a procedure to follow when a given movable station is to construct a new, independent network while channel selection in a given basic station is performed according to the procedure in FIG. 3.

Contrary to the selecting order of channels in the basic station, the movable station sets "i=N−1" as a channel whose state is to be checked first (step L-1), and checks the use state of the channel (step L-3) to check whether the channel is being used by any other radio station (step L-4). If it is determined that no other radio station is using the channel, the movable station uses the channel (step L-5). If it is determined that some other radio station is using the channel, the movable station sets "i=i−1" to select the next channel (step L-6). If it is determined that all the channels are not checked (step L-2), the movable station repeatedly checks the use state of a channel. With this procedure, when the movable station constructs the independent network, the frequency in selecting channels that have no influences on the network including basic stations increases.

What is claimed is:

1. A communication channel selection method for a radio communication system comprising a plurality of radio stations, wherein each radio station transmits a control packet only when required on the communication channel, said communication channel selection method comprising the steps of:

when establishing a new communication link,
    checking a use state of a communication channel to determine if another radio station is using said communication channel; and selecting said communication channel if said communication channel is not in use, else repeating without delay said checking step for another communication channel; and when connecting to an existing link,
checking a use state of a communication channel to determine if another radio station is using said communication channel; and
selecting said communication channel if said communication channel is in use, else repeating said checking step for another communication channel;
wherein said steps of checking a use state comprises:
transmitting a control packet on said communication channel;
receiving a response from another one of said radio stations indicating that said communication channel is in use.

2. A method according to claim 1, further comprising the step of:
causing said another one of said radio stations which has received the control packet to transmit no response control packet upon reception of a response control packet from some other radio station.

3. A channel selection method for a radio communication system comprising one or more radio cells, one radio cell comprising a plurality of radio stations connecting to one radio cell sharing one channel, said channel selection method comprising the steps of:
causing each radio station to transmit a control signal only when required, but causing each radio station not to constantly transmit a control signal, when each radio station is to perform packet communication to irregularly and discontinuously perform communication;
causing each radio station to transmit a control signal as a control packet by using a communication channel; and
causing a radio station which is to perform communication to check a state of a communication channel, select a channel determined as a channel that is not being used by any other radio station when a new radio link is to be established, and select a channel determined as a channel that is being used by some other radio station when said radio station is to be connected to an existing radio link.

4. A method according to claim 3, further comprising the step of:
when a radio station which is to perform communication checks states of communication channels, causing said radio station to determine the use states of the channels by receiving packets transmitted from other radio stations by using the respective channels.

5. A method according to claim 3, further comprising the step of:
when a radio station which is to perform communication checks a state of a communication channel, causing said radio station to transmit the control packet and determine the use state of the channel on the basis of a response to the control packet from some other station.

6. A method according to claim 5, further comprising the step of:
causing a radio station which has received the control packet transmitted from said radio station which is to perform communication to transmit a response control packet.

7. A method according to claim 5, further comprising causing only a specific one of radio stations which have received the control packet transmitted from said radio station which is to perform communication to transmit a response control packet.

8. A method according to claim 3, further comprising, when a radio station which is to perform communication checks states of communication channels, causing said radio station to determine the use states of the channels by receiving packets transmitted from other radio stations by using the respective channels.

9. A method according to claim 3, further comprising, when a radio station which is to perform communication checks a state of a communication channel, causing said radio station to transmit the control packet and determine the use state of the channel on the basis of a response to the control packet from some other station.

10. A method according to claim 4, further comprising, when a radio station which is to perform communication checks a state of a communication channel, causing said radio station to transmit the control packet and determine the use state of the channel on the basis of a response to the control packet from some other station.

11. A method according to claim 8, further comprising, when a radio station which is to perform communication checks a state of a communication channel, causing said radio station to transmit the control packet and determine the use state of the channel on the basis of a response to the control packet from some other station.

12. A method according to claim 9, further comprising causing a radio station which has received the control packet transmitted from said radio station which is to perform communication to transmit a response control packet.

13. A method according to claim 10, further comprising causing a radio station which has received the control packet transmitted from said radio station which is to perform communication to transmit a response control packet.

14. A method according to claim 11, further comprising causing a radio station which has received the control packet transmitted from said radio station which is to perform communication to transmit a response control packet.

15. A method according to claim 9, further comprising causing a radio station which has received the control packet transmitted from said radio station which is to perform communication to transmit no response control packet upon reception of a response control packet from some other radio station.

16. A method according to claim 10, further comprising causing a radio station which has received the control packet transmitted from said radio station which is to perform communication to transmit no response control packet upon reception of a response control packet from some other radio station.

17. A method according to claim 11, further comprising causing a radio station which has received the control packet transmitted from said radio station which is to perform communication to transmit no response control packet upon reception of a response control packet from some other radio station.

18. A method according to claim 9, further comprising causing only a specific one of radio stations which have received the control packet transmitted from said radio station which is to perform communication to transmit a response control packet.

19. A method according to claim 10, further comprising causing only a specific one of radio stations which have received the control packet transmitted from said radio station which is to perform communication to transmit a response control packet.

20. A method according to claim 11, further comprising causing only a specific one of radio stations which have received the control packet transmitted from said radio station which is to perform communication to transmit a response control packet.

21. A communication channel selection method for a radio communication system comprising a plurality of radio stations, wherein each radio station transmits a control packet only when required on the communication channel, said communication channel selection method comprising the steps of:

when establishing a new communication link,
        checking a use state of a communication channel to determine if another radio station is using said communication channel; and
        selecting said communication channel if said communication channel is not in use, else repeating said checking step for another communication channel; and
    when connecting to an existing link,
        checking a use state of a communication channel to determine if another radio station is using said communication channel; and
        selecting said communication channel if said communication channel is in use, else repeating said checking step for another communication channel;
    wherein said steps of checking a use state comprises:
        transmitting a control packet on said communication channel; and
        receiving a response from another one of said radio stations indicating that said communication channel is in use,
    wherein said steps of checking the use state of a communication channel comprises the steps of:
        checking states of communication channels in a predetermined order common to all radio stations;
        checking the states of the communication channels in a reverse order to the predetermined order when an independent network is to be constructed.

22. A communication channel selection method for a radio communication system comprising a plurality of radio stations, wherein each radio station transmits a control packet only when required on the communication channel, said communication channel selection method comprising the steps of:

when establishing a new communication link,
        checking a use state of a communication channel to determine if another radio station is using said communication channel; and
        selecting said communication channel if said communication channel is not in use, else repeating said checking step for another communication channel; and
    when connecting to an existing link,
        checking a use state of a communication channel to determine if another radio station is using said communication channel; and
        selecting said communication channel if said communication channel is in use, else repeating said checking step for another communication channel;
    wherein said steps of checking a use state comprises:
        transmitting a control packet on said communication channel; and
        receiving a response from another one of said radio stations indicating that said communication channel is in use,
    wherein said plurality of radio stations comprise radio base stations and radio mobile stations, said channel selection method further comprising the steps of:
        causing each radio base station to transmit a transmission power of a packet as information;
        causing a mobile radio station which is to perform communication to transmit a packet with a maximum transmission power; and
        determining a transmission power of a packet on said communication channel on the basis of said maximum power and said transmission power transmitted from said base station.

23. A channel selection method for a radio communication system comprising one or more radio cells, one radio cell comprising a plurality of radio stations connecting to one radio cell sharing one channel, said channel selection method comprising the steps of causing each radio station to transmit a control signal only when required, but causing each radio station not to constantly transmit a control signal, when each radio station is to perform packet communication to irregularly and discontinuously perform communication;
    causing each radio station to transmit a control signal as a control packet by using a communication channel;
    causing a radio station which is to perform communication to check a state of a communication channel, select a channel determined as a channel that is not being used by any other radio station when a new radio link is to be established, and select a channel determined as a channel that is being used by some other radio station when said radio station is to be connected to an existing radio link;
    causing each radio base station to transmit a transmission power of a packet from a self-station as information; and
    causing a radio station which is to perform communication to determine, if a packet has been received from a destination radio station, a transmission power of a packet from said self-station in packet transmission on the basis of a reception power of the received packet and a transmission of the power packet, and set, if no packet has been received from said destination radio station, the transmission power of the packet from said self-station to the maximum transmission power.

24. A method for establishing a communication link between a plurality of radio stations using minimum transmission power comprising the steps of:

transmitting a control signal over a communication channel with a first transmission power when a communication link is desired, said control signal containing a data identifying said transmission power;
    waiting to receive a response to said control signal from another one of said radio stations;
    repeating transmitting said control signal and waiting to receive a response until a response is received, each time increasing said transmission power;
    receiving said control signal by another one of said radio stations; and
    transmitting a response with a power equal to said data identifying said received transmission power.

25. A method for establishing a communication link between a plurality of radio stations using minimum transmission power comprising the steps of:

transmitting a control signal over a communication with a maximum transmission power when a communication link is desired, said control signal containing a data identifying said maximum transmission power;
    receiving said control signal at another one of said radio stations;
    determining a power of said received control signal;
    calculating a propagation loss by subtracting said power of said received control signal from said maximum power data contained in said control signal; and
    establishing a communication link using a transmission power based on said propagation loss.

\* \* \* \* \*